Oct. 16, 1956     F. X. COSTANZO     2,766,518
METHOD FOR JOINING TOGETHER SECTIONS OF PLASTIC PIPE
Filed July 23, 1952
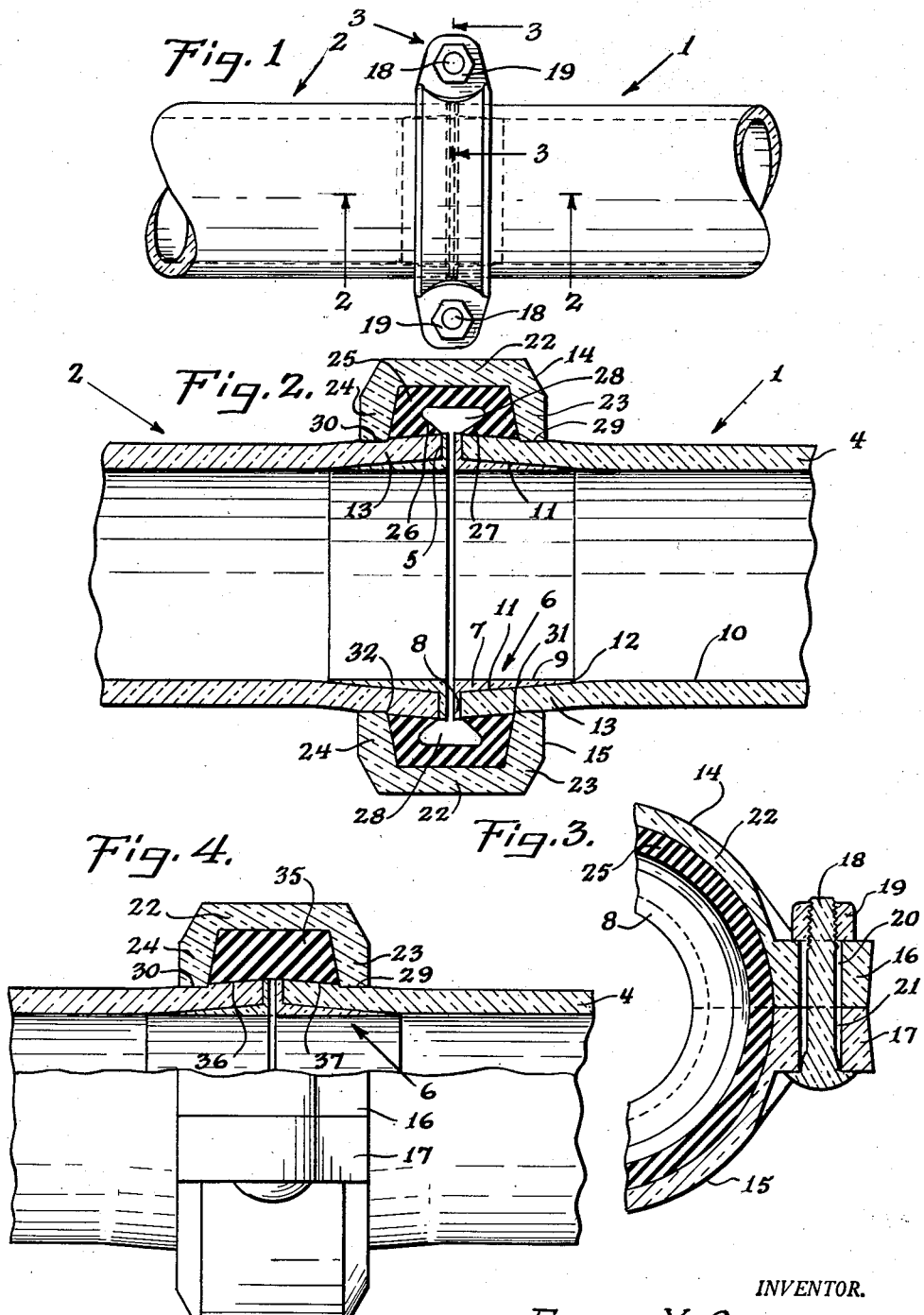
INVENTOR.
FRANK X. COSTANZO
BY
*Albert M. Parker*
ATTORNEY.

United States Patent Office 2,766,518
Patented Oct. 16, 1956

2,766,518

METHOD FOR JOINING TOGETHER SECTIONS OF PLASTIC PIPE

Frank X. Costanzo, Union, N. J., assignor to Victaulic Company of America, Union, N. J., a corporation of New Jersey Application July 23, 1952, Serial No. 300,449

2 Claims. (Cl. 29—517)

This invention relates to methods for joining together sections of plastic pipes. In particular, it is concerned with the forming of leak proof joints between the ends of adjacent pipes, of relatively soft plastic material, without pipe end preparation.

For a number of uses, pipes made of soft plastic material, of which material polyethylene is illustrative, offer considerable promise. For one thing, pipes formed of such material are produced in long lengths, presently running up to 200 feet, in pipe sizes from ¾" to 4". Even though such long lengths are employed they are easy to handle, for pipe made of such material may be rolled up on reels, unrolled from those reels and rolled up again after use if desired. Pipe formed of such material can be laid right on the terrain and accommodates itself to it.

The working pressures which soft plastic pipe will withstand is, of course, relatively low. It also presents poor resistance to cold flow and to permanent set. Thus, conventional methods for the joining together of pipe ends are unworkable for plastic pipes and the forming of joints between sections of them has presented quite a problem. Threading is out of the question, while grooving to provide for the reception of couplings somewhat weakens the pipe and the cold flow characteristics enable the groove to be distorted beyond workable limits.

The instant invention overcomes the foregoing and other drawbacks in the forming of leak proof joints between sections of soft plastic pipe. This is accomplished by striking out in a different direction from prior teachings and in achieving the desired end by taking advantage of the inherent capabilities of the pipe. When the course of the invention is followed, sections of plain ended soft plastic pipe can be joined together without collapse, in a leak tight joint, and in such a joint whose resistance against end separation is greater than the breaking strength of the pipe itself. Nevertheless, this is all accomplished in a simple, straightforward manner.

It is, accordingly, the principal object of this invention to provide for the effective joining of the opposed ends of soft plastic pipe.

Another object is to provide for such joining in a simple manner with a minimum of preparation.

Another object is to provide a novel method of effecting such joining.

Still another object is to provide for such joining which will provide ample greater resistance against pulling apart.

A still further object is to provide such joining while maintaining all parts of the joint exposed to the contents of the pipe resistant to the action of such contents.

A still further object of the invention is to provide a quick easy method of joining such pipes which may be carried out by unskilled labor with the use of simple tools.

Further and more detailed objects of the invention will in part be obvious and in part be pointed out as the description of the invention taken in conjunction with the accompanying drawing proceeds.

In that drawing:

Figure 1 is a top plan view of a joint between the ends of sections of pipe in accordance with the invention.

Figure 2 is a section taken on line 2—2 of Figure 1 and looking in the direction of the arrows.

Figure 3 is a fragmentary section taken on line 3—3 of Figure 1 and looking in the direction of the arrows, and Figure 4 is a front elevation, with a part being broken away, and shown in section, of a modified form of the invention.

Referring to the drawing in detail, the joint of the invention consists generally of two pieces of plastic pipe, 1 and 2, being joined together, and a coupling 3 which joins them. The sections of pipe, 1 and 2, are both made of the same material which as here considered is of the soft plastic type which can be extruded into substantial lengths. Various forms of plastic tubing are usable in this manner. Tubing made of polyethylene, or related materials, appears at present to provide the best characteristics for this purpose.

Since it is contemplated that the joint here shown is made between two sections of pipe, or tubing, of the same material and of the same dimensions, the formation of the tubing at one side of the joint is all that needs to be considered in detail. Such detail is understood to be equally applicable to the other section of tubing.

To start with, the tubular material is of the plain end type which terminates at a straight end 5 in a plane transverse to the axis of the tube. Normally, the tube would extend all the way to this end with uniform diameter. In accordance with the invention, however, the pipe is flared outwardly to a moderate extent as it approaches the end 5. This flare, which is materially exaggerated in the drawing for the sake of illustration, is achieved by the use of an internal sleeve, generally indicated at 6.

The sleeve 6 is formed with a collar portion 7 extending within the pipe and with peripheral flange 8. This flange overlies the end 5 of the pipe and lies thereagainst when the sleeve is fully seated. The sleeve 6 preferably presents a cylindrical inner surface 9 of substantially the same internal diameter as the internal diameter 10 of the pipe section 4. The external surface 11, however, of the sleeve 6, is tapered slightly from its inner end 12 to where it joins the flange 8. This taper, causing as it does the flaring of the section 13 of the pipe adjacent its end, is of the same taper as that flare and is here exaggerated for the purposes of illustration.

The sleeve 6 not only causes the flare of the pipe but also strengthens it against collapse so must necessarily be of a more rigid plastic material than that of the pipe. Preferably the rigidity of the sleeve 6 should be that of a material between soft and hard rubber. Examples of this are thermo-setting plastic rubber materials. One group, highly effective, is that now known as Plastic Rubber Blends. The cellulose plastics make up another group usable for this purpose. Ethylcellulose is particularly desirable, being a tough material which retains its toughness over a wide temperature range. Reinforced plastics, fibre, nylon, or fibre-glass may also be employed, as may the phenolic resins, styrene, or vinyl chloride plus a plasticizer.

As already mentioned, the foregoing and other materials which have sufficient rigidity to cause the flare in the pipe end when they are inserted in it, and will resist collapse or crushing of the pipe due to external action, to an extent to enable gripping of the outside of it, may be employed for this purpose. It is to be kept in mind, however, that where resistance to chemical action of the contents of the pipe is a factor, the material employed should be selected accordingly.

The mounting of the sleeve in the end of the pipe can be effected merely by the holding of the pipe by hand and forcing the sleeve in. Sleeves started into adjacent pipe ends can be fully seated by engaging their flanges 8 and forcing the pipe ends toward each other. Care should be taken to see that the sleeves are forced in all the way so that their flanges 8 engage the ends 5 of the pipe sections. This assures that the flared section 13 of each pipe section will be the same. Such uniformity is important from the standpoint of the location and action of the coupling now to be described.

The coupling 3 generally comprises a pair of semi-circular housings 14 and 15. These, as shown, have extending bolt pads 16 and 17 for enabling the housings 14 and 15 to be brought together to clamp the pipe. As here shown, such clamping is effected by the means of bolts 18 receiving nuts 19. The shanks of the bolts 18 pass through aligned perforations, such as 20 and 21 in the bolt pads so that the bolt pads are held between the head of the bolt and the nut 19. It is understood, however, that instead of effecting the clamping by means of a nut and bolt for each pair of bolt pads, as here shown, such can be carried out by means of a bolt through one pair of pads and a hinge between the other pair. In addition, toggles could be employed where one or both pairs of pads come together. Other suitable means for holding the two housings in compressive grip on the pipe could also be employed.

Each of the housing sections 14 and 15 is channel shape in cross section, as shown in Figure 2. These channels consist of a base part 22 with key sections 23 and 24 extending laterally therefrom. The space within such channels is occupied by a gasket 25 of the internal pressure responsive type. The gasket 25 has an internal annular chamber 28 bordered by spaced lips 26 and 27. These lips engage the exterior surfaces of the pipes and may also engage the borders of the flanges 8 adjacent their peripheries. It is important, however, that the gasket which surrounds the joint be centered over that joint so that pressure escaping from between the ends of adjacent pipe sections into the chamber 28 will act evenly upon the inner surfaces of each of the lips 26 and 27 causing those lips to act evenly upon the exterior of the flared portions 13 of the pipes. The centering of the gasket in this construction is of particular significance, since the flaring of the pipe would otherwise cause considerable difference in the engagement of the lips 26 and 27 with the pipe.

The key sections 23 and 24 terminate in circular end faces 29 and 30 which preferably lie in a cylindrical zone coaxial with the pipe and on a radius the same as, or only slightly greater than, that of the outside of the unflared part of the pipe. The difference, if any, between the radius on which the surfaces 29 and 30 are generated and the radius of the normal external diameter of the pipe will be determined by such factors as the softness and cold flow characteristics of the pipe material 4, the taper given to the portion 13 of the pipe, and the strength of the expander sleeve 6. The object is to have the key sections tightly engage the tapered sections of the pipe and prevent the same from being pulled apart while making a joint which is liquid tight and at least as strong as the pipe itself.

The housings 14 and 15, in accordance with the invention, are brought into engagement with the exterior surface of the pipe and the clamping screws, or other clamping means, are tightened up. The key sections 23 and 24 serve to compress the pipe material slightly against the resistance of the expander sleeves 6. At the same time, the surfaces 29 and 30 bite somewhat into the pipe material. Due to the taper of the pipe at this position, the biting in occurs principally at the inner edges 31 and 32 of the respective key sections and diminishes towards the outer edges thereof. The key sections engage the tapered part of the pipe sections at positions well spaced from the ends thereof since the gasket 25 occupies a considerable portion of the tapered ends.

This biting in appears not to noticeably weaken the pipe as against the forming of definite grooves therein, even though the effect of it is to form grooves. In fact, a joint so formed has been found to be stronger than the pipe itself, both from the standpoints of preventing leakage and pulling apart.

Effective couplings, in accordance with the invention, may, of course, be formed of malleable iron or steel, when corrosion is no problem. If corrosion resistance is desired, the housing sections may be formed of various corrosion resistant metals, such as brass, bronze, aluminum, magnesium aluminum alloys, or other recognized anti-corrosive metals. Sufficient gripping strength can also be achieved by making the housing sections out of re-enforced plastic, plastic rubber blends, and nylon, which is either injection or compression molded, and is preferably re-enforced.

The clamping bolts 18, or other clamping elements, would generally be made of the same material as the housing. For both housings and clamping bolts, plastic material with metal inserts may be used. For bolts and other clamping members, plastic materials re-enforced with fibre-glass has been found to be most effective.

Whether corrosion resistance of the coupling is of any importance or not, it is important to note that in the forming of pipe end joints between sections of soft plastic pipe, as here described, the housings and clamping means for the coupling, as already pointed out, may be made of suitable plastic materials preferably re-enforced. These materials have the strength required to provide effective clamping action. They are lighter than the metals and thus easier to handle and ship and they go hand in hand with the material of the pipe and expander sleeve to provide a novel and highly effective pipe joint.

Though a coupling gasket of C-shape in cross-section and of the internal pressure type is to be preferred, an effective and leakproof joint, in accordance with the invention, may be made employing a solid rather than a hollow gasket. Such a gasket is shown at 35 in Figure 4. The gasket 34 is formed of highly compressible material so that on the closing of the coupling by bringing the housing sections together, it will be compressed within the housing and against the exterior surfaces of the pipe ends. This compression is enhanced by the fact that the portions 36 and 37 of the pipe ends which extend within the chamber provided by the walls of the housing are tapered upwardly so as to extend upwardly within that chamber. Thus they further assist in the compression of the gasket.

With the upward incline of the sections 36 and 37 and the inward and upward incline of the inside walls of the key sections 23 and 24, it will be appreciated that ample compression of the gasket is effected when the clamping nuts are drawn tight on the clamping bolts. In all other respects the construction here shown is the same as that shown in Figures 1, 2 and 3. Accordingly, the reference characters used on Figures 1, 2, and 3 are applied in like manner to this construction.

From the foregoing, it will be apparent that the invention embraces a new and improved method of joining pipe ends, as well as a novel joint. That method enables the joining of ends of soft plastic pipe in a simple, effective manner, without pipe end preparation, which manner is capable of being carried out by relatively unskilled labor. The invention thus opens up a new field of use for soft plastic pipe by enabling sections of it to be joined in a tight reliable manner, and to be disjointed when such is desired, while leaving the pipe in condition to be joined again when desired. The joining of the invention is productive of surprising results which would not normally be expected from the manner in which the joining is achieved.

Since it will be apparent to those skilled in the art that certain changes may be made in the constructions set forth and in the carrying out of the method which embody the invention without departing from its scope, it is intended that all matter contained in the above description, or shown in the accompanying drawing shall be interpreted as illustrative and not in a limiting sense.

Having described my invention, what I claim as new and desire to secure by Letters Patent is:

1. The method of forming a joint between a pair of sections of relatively soft plastic pipe which comprises, inserting separate sleeves of semi rigid plastic material into the ends of each of said sections of pipe to engage the inner surface thereof for a short portion of the length thereof, bringing said ends of said pipe into opposition in axial alignment, seating an annular gasket over said opposed ends with lip portions engaging the outer surfaces of said short portions and with a bridging portion extending between said lip portions across said opposed ends, seating a housing formed of rigid material over said gasket to encompass the exterior of the same and to engage said short portions in annular bands exteriorly of said gasket, tightening said housing about said pipe sections, and radially driving annular portions of said housing a short distance into the material of said pipe around said annular bands by applying a force transversely with respect to said pipe.

2. The method of forming a joint between a pair of sections of relatively soft plastic pipe which comprises flaring portions of said sections of pipe outwardly from positions spaced from the ends thereof towards said ends, seating semi rigid separate plastic sleeves within said flared portions with their outer surfaces in engagement with the interiors of said flared portions, bringing said ends of said pipe into opposition in axial alignment, seating an annular gasket over said opposed ends with lip portions engaging the exterior of said flared portions and with a bridging portion extending between said lip portions across said opposed ends and centrally located with respect to the same, seating a housing formed of separate arcuate portions of rigid material over said gasket to encompass the exterior of the same and to engage the exterior surfaces of said flared portions in annular cylindrical bands exteriorly of said gasket, drawing said housing portions together by action transversely with respect to said pipe sections to substantially complete circles about said pipe sections and driving annular portions of said housing radially inwardly a short distance into the material of said pipe around said annular bands to grip said pipe sections radially and prevent longitudinal separation of the same.

References Cited in the file of this patent

UNITED STATES PATENTS

| | | |
|---|---|---|
| 173,307 | Leland | Feb. 8, 1876 |
| 236,957 | Ott | Jan. 25, 1881 |
| 622,534 | Preschlin | Apr. 10, 1899 |
| 1,222,088 | Evans | Apr. 10, 1917 |
| 1,252,888 | Dorsey | Jan. 8, 1918 |
| 1,507,138 | Pierce | Sept. 2, 1924 |
| 1,541,601 | Tribe | June 9, 1925 |
| 1,571,343 | Register | Feb. 2, 1926 |
| 1,607,943 | Carson | Nov. 23, 1926 |
| 1,857,297 | Faulkner | May 10, 1932 |
| 1,876,455 | Inshaw | Sept. 6, 1932 |
| 2,016,375 | Kipnis | Oct. 8, 1935 |
| 2,267,533 | O'Brien | Dec. 23, 1941 |
| 2,545,263 | Corydon | Mar. 13, 1951 |
| 2,725,246 | Weinhold | Nov. 29, 1955 |

FOREIGN PATENTS

| | | |
|---|---|---|
| 564,330 | Great Britain | Sept. 22, 1944 |